US009670782B2

(12) United States Patent
Göhler et al.

(10) Patent No.: US 9,670,782 B2
(45) Date of Patent: Jun. 6, 2017

(54) METHOD FOR CREATING A BLADE FOR A FLOW ENGINE AND BLADE FOR A FLOW FORCE ENGINE

(75) Inventors: Jens Göhler, Stauchitz (DE); Frank Kernstock, Windhoek (NA); Olaf Rehme, Hamburg (DE); Martin Schäfer, Berlin (DE)

(73) Assignee: SIEMENS AKTIENGESELLSCHAFT (DE)

( * ) Notice: Subject to any disclaimer, the term of this patent is extended or adjusted under 35 U.S.C. 154(b) by 434 days.

(21) Appl. No.: 14/234,569

(22) PCT Filed: Jul. 20, 2012

(86) PCT No.: PCT/EP2012/064248
§ 371 (c)(1),
(2), (4) Date: Feb. 12, 2014

(87) PCT Pub. No.: WO2013/017433
PCT Pub. Date: Feb. 7, 2013

(65) Prior Publication Data
US 2014/0178206 A1  Jun. 26, 2014

(30) Foreign Application Priority Data
Aug. 1, 2011 (DE) .................. 10 2011 080 187

(51) Int. Cl.
*F01D 5/14* (2006.01)
*B23P 6/00* (2006.01)
(Continued)

(52) U.S. Cl.
CPC .............. *F01D 5/14* (2013.01); *B22F 3/1055* (2013.01); *B22F 5/04* (2013.01); *B23K 26/34* (2013.01);
(Continued)

(58) Field of Classification Search
CPC .... F01D 5/005; F05D 2260/02; F05D 223/80; Y10T 29/49732; Y10T 29/49734;
(Continued)

(56) References Cited

U.S. PATENT DOCUMENTS 3,650,635 A * 3/1972 Wachtell ............. B22D 27/045
29/402.13
4,326,833 A * 4/1982 Zelahy .................... B23P 6/005
29/402.13
(Continued)

FOREIGN PATENT DOCUMENTS

CN          1824840 A       8/2006
DE   10 2006 030365 B3     12/2007
(Continued)

OTHER PUBLICATIONS

International Search Report dated Oct. 26, 2012 issued in corresponding International patent application No. PCT/EP2012/064248.
(Continued)

*Primary Examiner* — Jason L Vaughan
(74) *Attorney, Agent, or Firm* — Ostrolenk Faber LLP

(57) ABSTRACT

A method for creating a blade (11) for a turbo-engine and such a blade are disclosed. Components (19) of the blade are produced by an additive production method such as selective laser melting or fusion, while a main body (18) is produced by casting, for example. The blade components (19) may consist of a different material than the basic body (18). The components or body may carry functions such as serving as drainage slots (24). Expense related to the use of additive production methods occurs only for the components (19) in which a complicated geometry, for example, must be implemented. The remaining components in the form of the main body (18), comprising the blade (27), the blade foot (28) and
(Continued)

the blade head (29), can be cost-effectively implemented as a cast part or a sheet metal part.

5 Claims, 2 Drawing Sheets

(51) Int. Cl.
| | |
|---|---|
| *B22F 3/105* | (2006.01) |
| *B22F 5/04* | (2006.01) |
| *B23P 15/04* | (2006.01) |
| *F01D 5/00* | (2006.01) |
| *F01D 5/28* | (2006.01) |
| *B23K 26/34* | (2014.01) |
| *B23K 101/00* | (2006.01) |
| *B22F 7/08* | (2006.01) |
| *B22F 7/06* | (2006.01) |

(52) U.S. Cl.
CPC ............... *B23P 6/007* (2013.01); *B23P 15/04* (2013.01); *F01D 5/005* (2013.01); *F01D 5/286* (2013.01); *B22F 7/08* (2013.01); *B22F 2007/068* (2013.01); *B23K 2201/001* (2013.01); *F05D 2230/21* (2013.01); *F05D 2230/31* (2013.01); *F05D 2240/303* (2013.01); *F05D 2260/602* (2013.01); *Y02P 10/295* (2015.11); *Y10T 29/49336* (2015.01)

(58) Field of Classification Search
CPC ........ Y10T 29/49737; Y10T 29/49742; B33Y 10/00; B33Y 80/00
See application file for complete search history.

(56) References Cited

U.S. PATENT DOCUMENTS

| | | | | |
|---|---|---|---|---|
| 4,832,252 | A * | 5/1989 | Fraser | B23P 6/005 228/119 |
| 4,896,408 | A * | 1/1990 | Fraser | B23P 6/005 29/402.08 |
| 5,597,589 | A * | 1/1997 | Deckard | B23K 26/0624 264/401 |
| 5,794,338 | A * | 8/1998 | Bowden, Jr. | B23P 6/007 29/402.09 |
| 6,568,077 | B1 * | 5/2003 | Hellemann | B23K 9/044 228/19 |
| 7,343,676 | B2 * | 3/2008 | Ng | B23K 35/0238 228/119 |
| 7,363,707 | B2 * | 4/2008 | Powers | B23K 1/0018 29/889.1 |
| 7,509,734 | B2 * | 3/2009 | Memmen | B23P 6/007 29/402.09 |
| 7,685,712 | B2 | 3/2010 | Foucher et al. | 29/889.6 |
| 7,810,237 | B2 | 10/2010 | Lange et al. | |
| 7,934,315 | B2 * | 5/2011 | Milleville | B23P 6/002 148/527 |
| 8,205,334 | B2 * | 6/2012 | Leibfried | B23P 6/002 29/402.06 |
| 8,240,046 | B2 * | 8/2012 | Peretti | B23K 9/04 29/402.09 |
| 8,539,659 | B2 * | 9/2013 | Szela | B24B 39/06 29/402.09 |
| 8,910,361 | B2 * | 12/2014 | Rickenbacher | B23P 6/005 29/402.13 |
| 8,978,249 | B2 * | 3/2015 | Hovel | B23P 6/005 29/402.09 |
| 9,163,511 | B2 * | 10/2015 | Wojciechowski | F01D 5/005 |
| 9,266,170 | B2 * | 2/2016 | Godfrey | B23P 15/04 |
| 2004/0026807 | A1 * | 2/2004 | Andersson | B29C 67/0077 264/40.1 |
| 2005/0268998 | A1 * | 12/2005 | Bostanjoglo | B22F 3/1055 148/538 |
| 2006/0248718 | A1 * | 11/2006 | Szela | B22F 5/009 29/889.1 |
| 2006/0277753 | A1 * | 12/2006 | Ntsama-Etoundi | B23P 6/005 29/889.1 |
| 2007/0007260 | A1 | 1/2007 | Steinhardt | |
| 2009/0081066 | A1 * | 3/2009 | Illston | B22F 3/1055 419/8 |
| 2009/0194247 | A1 * | 8/2009 | Kriegl | B23P 6/007 164/76.1 |
| 2009/0252987 | A1 * | 10/2009 | Greene, Jr. | G01N 29/228 428/678 |
| 2010/0035084 | A1 | 2/2010 | Jabado et al. | |
| 2011/0052386 | A1 | 3/2011 | Schoonover et al. | |
| 2011/0052412 | A1 | 3/2011 | Ader et al. | |
| 2011/0106290 | A1 * | 5/2011 | Hovel | B22F 3/1055 700/120 |
| 2011/0129600 | A1 | 6/2011 | Das et al. | |
| 2012/0255176 | A1 | 10/2012 | Flesch et al. | 29/889.1 |
| 2013/0001837 | A1 | 1/2013 | Göhler et al. | |

FOREIGN PATENT DOCUMENTS

| | | |
|---|---|---|
| DE | 10 2009 048 665 A1 | 3/2011 |
| EP | 2 218 530 A1 | 8/2010 |
| EP | 1 620 225 B1 | 5/2011 |
| EP | 2 319 641 A1 | 5/2011 |
| FR | 2 954 200 A1 | 6/2011 |
| WO | WO 2005/016588 A2 | 2/2005 |
| WO | WO 2011/076890 A1 | 6/2011 |

OTHER PUBLICATIONS

Written Opinion dated Oct. 26, 2012 issued in corresponding International patent application No. PCT/EP2012/064248.
Chinese Office Action issued Jun. 2, 2015 for corresponding Chinese Patent Application 201280037324.1.

* cited by examiner

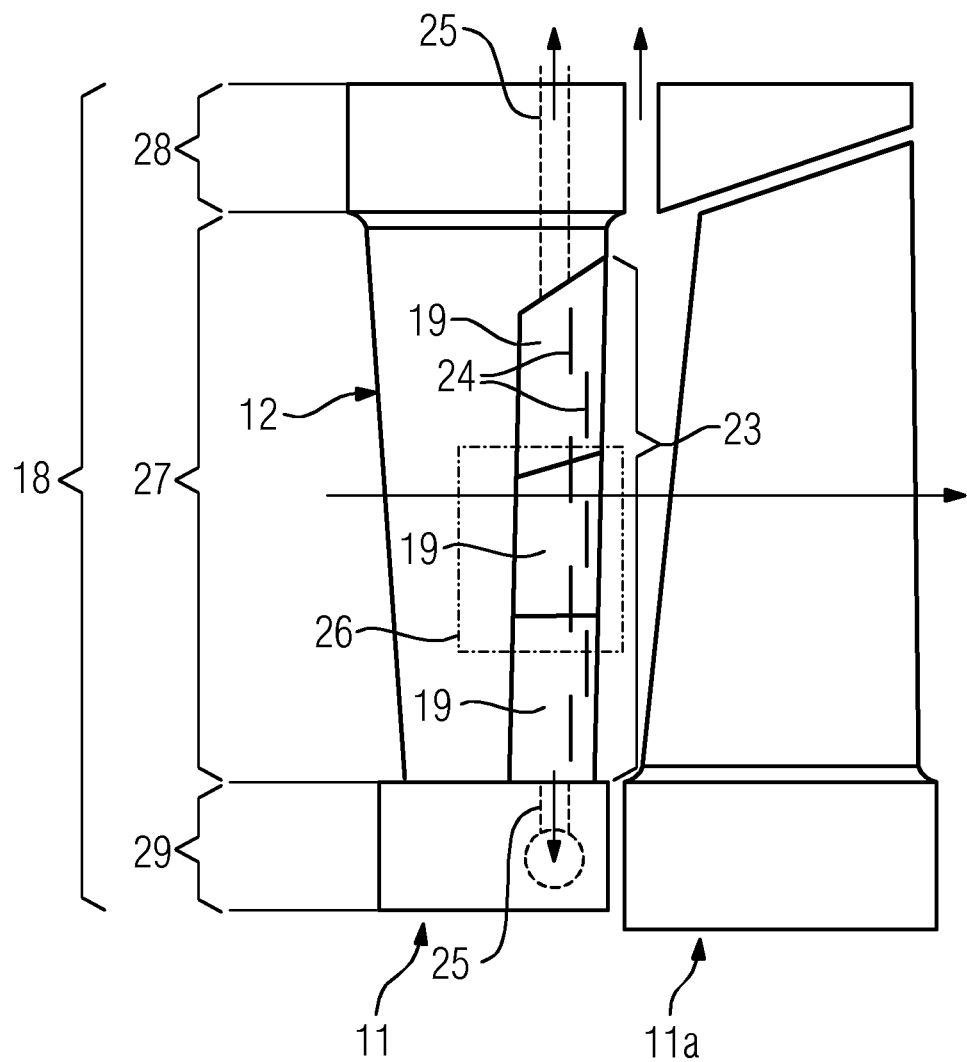

METHOD FOR CREATING A BLADE FOR A FLOW ENGINE AND BLADE FOR A FLOW FORCE ENGINE

CROSS-REFERENCE TO RELATED APPLICATIONS

The present application is a 35 U.S.C. §§371 national phase conversion of PCT/EP2012/064248, filed Jul. 20, 2012, which claims priority of German Patent Application No. 10 2011 080 187.1, filed Aug. 1, 2011, the contents of which are incorporated by reference herein. The PCT International Application was published in the German language.

FIELD OF THE INVENTION

The invention relates to a method for making a blade for a turbo-engine, in particular a guide vane, in which a basic body of the blade is produced and this basic body is connected permanently to at least one blade component completing the basic body to form the finished blade. Moreover, the invention relates to a blade for a turbo-engine, wherein the blade is comprised of a basic body and of at least one blade component connected permanently to the body. Blades for turbo-engines are hereafter described. Those blades are used in various types of turbines that spin in a steam or gas environment and may include aircraft jet engines.

TECHNICAL BACKGROUND

A blade component of the type initially specified and a method for producing it are described, for example, in DE 10 2006 030 365 B3. This is a blade which is to be provided with an invisible marking. This marking constitutes a blade component which completes the basic body of the blade to the effect that additional functionality is added, to be precise the blade can be assigned to a specific blade type by means of a suitable detection instrument.

Furthermore, it is known from DE 10 2009 048 665 A1 that turbine blades can be produced by means of additive production methods. In this case, the entire blade is built up by means of an additive production method, such as, for example, selective laser beam fusion, in which case complex geometric supporting structures can be built up in the hollow interior of the blade. This assists in making a stable blade, along with savings with regard to the mass of structural parts. In this case, both the comparatively filigree supporting structure inside the blade and the blade wall regions, which are robust in comparison with these, are produced by means of the additive manufacturing method.

According to EP 1 620 225 B2, it is also known that turbine blades can be repaired in that, by means of a rapid manufacturing process, replacement parts can be produced as fitting pieces for the locations on the turbine blade which are to be repaired.

A generative manufacturing method for components of gas turbines can be gathered from EP 2 218 530 A1. This provision whereby the blade segments, of which the blade ring of the turbine rotor is composed, can be produced generatively. These blade segments may also be directly on a finished or prepared carrier. This carrier is at the same time a structural element of the finished turbine rotor.

SUMMARY OF THE INVENTION

The object of the invention is to specify a manufacturing method for blades of turbo-engines, by means of which different requirement profiles for the blades can be implemented comparatively easily. Moreover, the object of the invention is to specify a blade for a turbo-engine, which blade is adapted comparatively easily to the requirement profile compliant with use and at the same time is cost-effective to produce.

According to the invention, the object is achieved by means of the method initially mentioned in that only the at least one blade component of the blade is produced by means of an additive manufacturing method, while the basic body of the blade, said basic body also carrying the blade component, is produced by means of another method. As a result, advantageously, a blade basic body can be produced which forms the large part of the blade mass. This basic body usually has to fulfil requirements other than those of specific regions of the blade which are formed by the blade component. For example, the blade component could be the leading region of a blade, this leading region being exposed to particular erosive stress, for example in a steam turbine. This blade component can then be produced from another material by means of the additive manufacturing method employed according to the invention.

It is therefore necessary merely to produce this region of the blade component by means of the additive manufacturing method. Advantageously, a production-induced distortion of the entire blade can thereby be kept low. Moreover, additive manufacturing methods are suitable particularly for the production of small structures, since, in the case of more bulky structures, the outlay in manufacturing terms rises considerably. By the basic body being produced, for example, by casting or by joining together metal sheets, on the one hand, a large part of the blade mass can be made by means of a cost-effective production method and, on the other hand, structural regions which have to fulfil special requirements are produced by means of an additive production method adapted individually to these requirements.

A suitable additive production method is, in particular, selective laser beam fusion. In this case, according to an advantageous refinement of the method according to the invention, the at least one completing blade component can be produced directly, by means of selective laser beam fusion or another additive production method, on the basic body serving as a substrate. In this case, it should be noted that a substrate is always required for additive manufacturing methods. This serves for producing the first layer of the blade component which is to be built up in layers. If the basic body is used as a substrate, a connection between the basic body and blade component is thereby advantageously already made, so that subsequent detachment of the blade component from the substrate and connection of the blade component to the basic body do not have to take place. This manufacturing method is suitable particularly for the series production of turbine blades, where a tool suitable for picking up the basic body can be inserted into the machine of the additive manufacturing method.

In another advantageous refinement of the invention, the at least one completing blade component is produced as a separate structural part with a joining surface adapted to the basic body and is joined to the basic body in a materially integral manner. This procedure has the advantage that the basic body of the blade does not have to be introduced into the plant for the additive manufacturing method (also designated below in brief as the additive manufacturing plant). Instead, the blade component can be produced simultaneously together with other blade components on the substrate which the plant makes available for the additive manufacturing method. After the blade components have been separated from the substrate, these can be connected to the basic bodies of the blades via the joining surfaces, for example by soldering or welding.

The latter method is also suitable, in particular, for repair methods in which the basic body used is a damaged blade, the damage is removed by making a clearance in the region of the damage and a fitted piece for the clearance is made as a completing blade component. If, for example, the clearance is made in the blade by means of a CNC milling cutter, the geometric data of the joining surface thus arising in the clearance are already available. These can be used directly in the additive manufacturing method in order to produce the fitting piece exactly to shape. In this case, therefore, the basic body arises from a used blade in that a damaged location is removed by the introduction of a clearance. The basic body is thus the blade provided with the clearance. The fitted piece is the blade component to be completed. After the insertion of the latter, the damaged blade is repaired and can be supplied for use in a further life cycle.

The fitted piece may, of course, also be produced directly in the blade, in that the latter is positioned in the plant of the additive manufacturing method in such a way that the clearance can be filled with a material so as to form the fitted piece. As a consequence of the method, in this case, the joining surface selected for the additive manufacturing method must only be two-dimensional.

In general, a material other than the material of the basic body may be used as material for producing the blade component. In particular, in a repair method, a material other than that provided for the region of damage before repair may also be used for the fitted piece (blade component). In this case, the fact that the blade has undergone damage may afford the opportunity to improve the properties of structural parts in this endangered region by the choice of a harder material. Advantageously, as a result, blades which have been produced in one part on account of the outlay in manufacturing terms can be equipped at a later date with an improved property profile by means of the repair method. In particular, in this case, the resistance to wear can be improved. The basic body of the blade may, for example, be produced, as is customary, from a nickel-based alloy (for example, in gas turbines) or from a chromium steel (in steam turbines). In the repair or even in the production of the blade, for the blade component a cobalt-based alloy can then be used which has improved resistance to wear, as compared with nickel-based alloys or chromium steel.

An especially advantageous refinement of the invention is obtained if a plurality of completing blade components are produced which butt one against the other directly and together give a completing structure for the basic body. In this case, the dimensions of the completing structure exceed the construction size capacity of the additive manufacturing plant used. Advantageously, even a completing structure can thereby be produced which is larger per se than the conventional practicable construction size of a specific manufacturing plant. The individual blade components are then either joined together before being joined to the basic body or the individual blade components are connected to the basic body in succession, in each case a connection to the other blade components butting directly against these also being made. It is also possible that the blade components which together form a completing structure are produced directly on the basic body of the blade, this basic body then having to be displaced in the additive manufacturing plant, in each case after the end of production of a blade component, so that the adjacent blade component can be produced directly on the basic body. Furthermore, the object is achieved, according to the invention, by means of the blade initially specified, in that the blade component which completes the basic body to form the finished blade is an additively produced structural part. The advantages already explained above are thereby achieved.

According to an advantageous refinement of the blade according to the invention, there may be provision whereby further functionality of the blade is integrated into the at least one blade component. Functionality is understood to mean functions which the blade must fulfil and which can advantageously be performed in a simple way by the blade component. In particular, the further functionality may comprise drainage slots which give the blade a comparatively complex geometry and can therefore be produced additively with their final geometry without re-machining. Use can in this case be made of the fact that undercuts can also be produced without difficulty by means of additive manufacturing methods, so that the cavities behind the drainage slots arise inside the blade during the additive manufacturing method.

Further functionalities can be implemented by the blade component. For example, marking of the blade is possible according to DE 10 2006 030 365 B3 indicated initially. In this case, the component is produced additively with the required magnetically readable pattern by means of magnetizable material, for example, in a clearance in the surface of the blade and in a second additive manufacturing step is then filled with the material of the blade.

A supporting structure may also be produced on a, for example, cast basic body according to DE 10 2009 048 665 A1, so that the entire outer wall of the blade does not have to be produced additively. This method can advantageously be carried out, in particular, when the basic body serves as a substrate for the additive production of the supporting structure.

Furthermore, cooling-air holes and the duct structures connected to these cooling-air holes can be produced additively inside the blade. Cooling-air holes are used, for example, in turbine blades in order to generate a film of cooling air on the turbine blades subjected to the highest thermal stress and consequently to reduce the thermal stress.

It is also possible to produce wear indicators inside the blade additively. These may be, for example, blade regions produced from a material which differs in color from the remaining blade material. In the event that the blade surface is stripped off as a consequence of wear, this material is at some stage brought to light and makes it possible to check the wear of the structural part visually. This may take place particularly in structural regions of the blade which are in any case subjected to high wearing stress and therefore are produced additively with a material other than the basic body of the blade. It is possible, for example, when the additive material layers are being applied, for colorant, which may be composed, for example, of ceramic particles, to be provided in only one layer, the thickness of the layers defining unequivocally at what distance from the surface of the finished blade component the colorant is embedded. The layers of blade material which are applied above the colored layer then correspond in their thickness exactly to the permissible amount stripped off as a consequence of wear. Wear indicators of this type may be used, for example, on the leading edge of the blade.

Drainage slots can be provided in guide vanes of steam turbines particularly on the suction and the pressure side. Such drainage slots are normally provided in guide vanes which are employed in the expansion area in the wet steam region of steam turbines. These blades are typically formed from sheet metal, two shells being assembled in such a way that a cavity is obtained. These metal sheets are welded to one another.

In order to ensure that water is led away from the near-wall flow, the condensed water is sucked away from the surface of the blade by a vacuum being applied to the drainage slots. The thickness of the water film can thereby be reduced, thus leading to a reduction in the wear of the guide vanes. In another possible use of the drainage slots, steam can be fed through these, which heats the blade surface, evaporates the water film located on this and prevents the build-up of a new water film.

The arrangement of the slots can be adapted to the need to suck away water or the need to feed steam, in which case complicated slot geometries may arise. These can advantageously be generated especially simply by means of the additive manufacturing method. Changes in design can also be implemented purely by software and then be incorporated directly into production during the additive manufacturing method, without new tools, such as gages or punching tools, having to be made.

Further details of the invention are described below by means of the drawing. Identical or mutually corresponding drawing elements are in each case given the same reference symbols in the individual figures and are explained more than once only insofar as differences between the individual figures arise. In the drawing:

BRIEF DESCRIPTION OF THE DRAWINGS

FIG. 5 shows another exemplary embodiment of the blade according to the invention diagrammatically as a top view.

DESCRIPTION OF EMBODIMENTS

Figure 1:
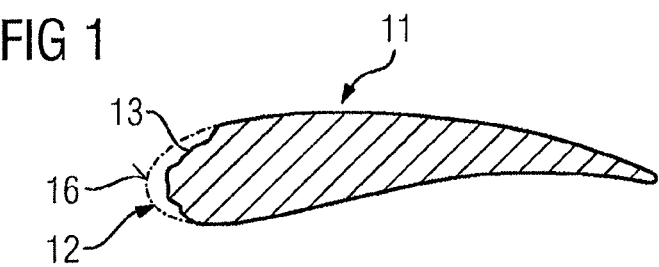
FIGS. 1 to 3 show selected steps of an exemplary embodiment of the method according to the invention for making a blade, the blade made being illustrated in each case in cross section.

FIG. 1 illustrates a blade 11 which is, for example, a guide vane for a steam turbine. This has a leading edge 12 which has been attacked erosively during the progressive operation of the blade 11. Damage 13 is indicated in FIG. 1.

Figure 2:
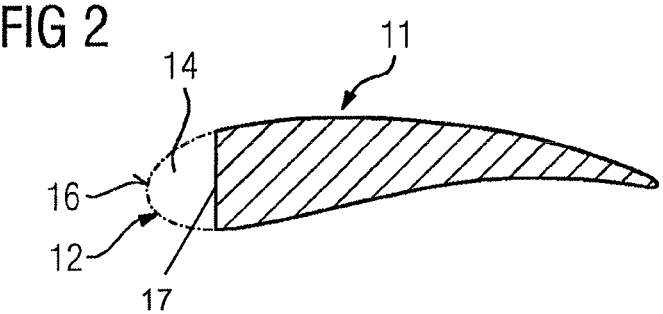

According to FIG. 2, then, a repair method is prepared. The region of the front blade edge is removed, for example by cutting, thus giving rise to a clearance 14. As can be gathered from FIG. 3, a fitting piece 15 is produced for this clearance by means of laser beam fusion and has exactly the configuration of the clearance, with the result that a contour (see FIGS. 1 and 2) of the structurally provided blade profile is restored. To be precise, as may be gathered from FIG. 1, because of the damage 13 the actual blade contour deviates from that structurally provided before the repair.

Figure 3:
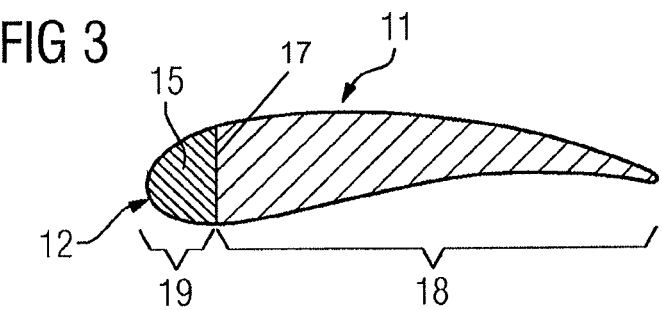

FIG. 3 illustrates in no more detail how the fitting piece can be produced additively. For this purpose, a conventional plant for selective laser beam fusion is used, in which the part is produced in layers in a metallic powder bed by a laser beam by means of local fusion. For this purpose, the powder bed is in each case added around a powder layer and the structural part is produced in this powder layer by fusion. The production of the next layer subsequently takes place in the next powder layer. In this case, for example, the CAD data of the blade geometry structurally provided can be used directly. Either the surface 17 of the clearance 14 can serve as a substrate for producing the fitting piece 15 or the workpiece bench substrate available in the additive manufacturing plant is used.

The repaired structural part according to FIG. 3 is then composed of a basic body 18 made from that blade material which was used during the first production of the blade 11. The fitting piece 15 forms a blade component which, in the exemplary embodiment according to FIG. 3, is also produced from another material. Although a nickel-based alloy was used for the basic body, the blade component is composed of a cobalt-based alloy. The resistance to wear is thereby improved in this blade region.

Figure 4:
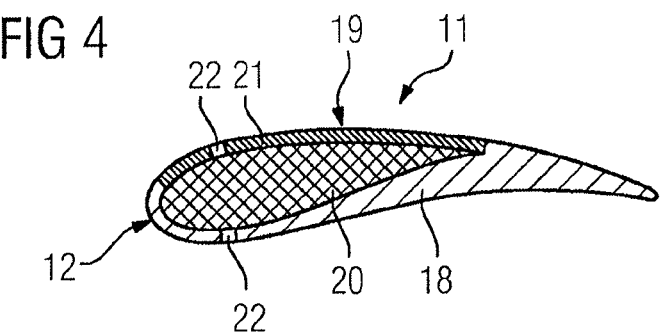
FIG. 4 shows an exemplary embodiment of the blade according to the invention in cross section.

The blade according to FIG. 4 could be, for example, a turbine blade, any layers on the surface of the blade not being illustrated. The basic body 18 forms a casting which constitutes a lower shell for the hollow turbine blade to be produced. By means of the additive manufacturing method, for example laser cladding (in laser beam fusion, the lower shell will have a planar surface as base, since the smoothing beam for the powder layer has to slide over it—see the next paragraph. A three-dimensional geometry can be implemented only by laser cladding or microcladding), in this lower shell a supporting structure is made in the form of a space lattice 20 which is closed off in the same manufacturing operation by means of a covering structure 21. The covering structure 21 then forms the upper shell in the finished blade 11, so that the space lattice 20 is located in the cavity formed by the upper shell and the lower shell. Moreover, the covering structure has cooling-air holes 22, so that, by overpressure being generated in the cavity, a cooling-air film can be formed on the surface of the blade. Such cooling-air holes 22 may also be provided in the basic body 18. This may be comprised, for example, of a casting, in which case the cooling-air holes can be made by drilling.

Production is also conceivable whereby the part 18 according to FIG. 4 is produced together with the space lattice 20 by means of laser beam fusion and is subsequently closed by means of the cover 21 produced conventionally in this variant, for example, by sheet metal bending. In this case, the surface of the construction platform lies parallel to the drawing plane.

The blade 11 designed as a guide vane is illustrated as a top view in FIG. 5. A further blade 11a, which forms a moving blade, is also illustrated as a top view. The guide vane 11 can be used in a steam turbine. A plurality of blade components 19 can be seen, which together afford a completing structure 23 which has drainage slots 24. These are connected to a suction duct 25, indicated by dashes, so that a liquid film which forms on the blade 11 can be sucked away.

The completing structure 23 is built up in three parts from three blade components 19. Each of the blade components 19 is sufficiently small so that it can be produced in an additive manufacturing plant, not illustrated in any more detail. A maximum size 26 is indicated, which, in general, structural parts should have in the additive manufacturing plant used. It is therefore shown that the completing structure 23 could not have been produced as a single blade component.

Furthermore, it can be seen in FIG. 5 that the basic body also has, in addition to an airfoil 27, a comparatively robust blade foot 28 and blade head 29. These three structural regions can be produced in one piece as the basic body 18 of the guide vane. The completing structure 23 is then composed only of the three blade components 19 which has a comparatively complicated geometry with the drainage slots 24.

The invention claimed is:
1. A method for repairing a damaged blade of a turbo-engine, the damaged blade having a damaged portion, and the method comprising the steps of:
- producing a basic body from the damaged blade by removing the damaged portion to make a clearance, the making of the clearance producing a surface on the basic body; and
- integrating the basic body permanently with a plurality of completing blade components to form a finished blade by producing each completing blade component directly on the surface on the basic body through additive manufacturing;
- wherein the plurality of completing blade components are provided to butt one another directly and together define a completing structure for the finished blade.

2. The method as claimed in claim 1, wherein the at least one of the completing blade components has a joining surface adapted to the basic body and the joining surface is joined to the basic body in a materially integral manner.

3. The method as claimed in claim 1, wherein at least one of the completing blade components is manufactured from a material other than a material of the basic body.

4. The method as claimed in claim 1, wherein at least one of the completing blade components is comprised of a replacement material that deviates from an original material of the damaged portion and the replacement material is selected to have better properties than the original material of the damaged portion.

5. The method as claimed in claim 4, wherein the replacement material is more resistant to wear than the original material of the damaged blade.

* * * * *